June 1, 1965 A. E. WENNSTROM 3,187,311
MEMORY CORE DEVICE
Filed March 1, 1960

Arthur E. Wennstrom,
*INVENTOR.*
*BY.*

*AGENT.*

3,187,311

MEMORY CORE DEVICE

Arthur E. Wennstrom, Los Angeles, Calif., assignor to Hughes Aircraft Company, Culver City, Calif., a corporation of Delaware Filed Mar. 1, 1960, Ser. No. 12,229
4 Claims. (Cl. 340—174)

Figure 1:
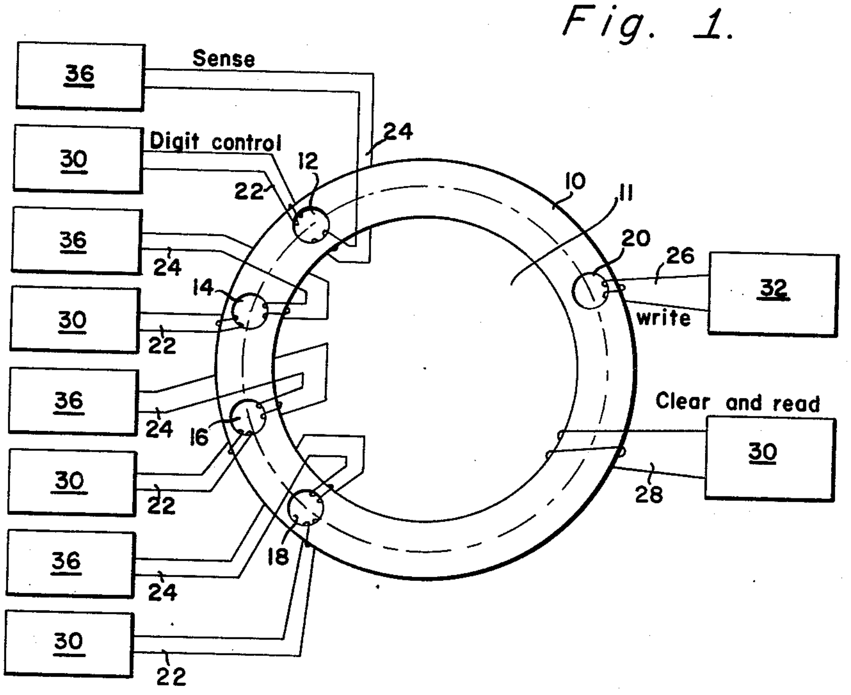

This invention relates to magnetic core memory devices and more particularly, to a multiple path magnetic element for storing binary information.

Magnetic devices employing magnetic cores having a substantially rectangular magnetic hysteresis characteristic have been utilized to a large extent as switching, memory, and computing elements. In all of these magnetic elements, toroidal or ring-shaped cores having single apertures and unique flux paths have been used because of their bistable properties.

However, more recent developments of this basic type of magnetic core device have yielded memory devices having a plurality of apertures arranged to provide multiple flux paths. Some of these magnetic devices having multiple apertures utilize the additional apertures merely for sensing the magnetic state of the core without disturbing the magnetic state of the core by the sensing operation. These latter devices are known as "nondestructive readout elements" and operate substantially similarly to single aperture toroidal cores.

Other multiple path magnetic structures have been used as gating or switching elements for amplifiers.

While previously developed multiple path coincident current memories have provided the advantages listed above, many of these devices are limited in speed of operation and nearly all are relatively complex and expensive to manufacture. In addition, the prior art devices have, in general, been limited to the storage of one binary bit of information per core.

It is therefore an object of this invention to provide a novel and improved magnetic element for use in a word-organized memory system.

It is another object of this invention to provide a multiple path magnetic element capable of operation at relatively high speeds.

It is still another object of this invention to provide a magnetic element of simple and inexpensive manufacture.

It is a further object of this invention to provide a magnetic element in which a single magnetic core may store a plurality of bits of binary information.

It is a still further object of this invention to provide a multiple path magnetic element which can provide nondestructive readout.

Briefly described, this invention includes a magnetic core having a plurality of apertures therein and a plurality of windings magnetically coupled to said apertures. Information will be impressed or written into the magnetic core by the application of a unidirectional current or "write" pulse to one of said windings and the simultaneous application of control current or "digit control" pulses to others of said windings. The directions of the control currents correspond to the binary information which is desired to be recorded in that the application of control current in a first direction or sense will record a binary "1" and the application of control current in an opposite direction will record a binary "0." While the unidirectional pulse may be of relatively large magnitude, the control pulses are chosen to be of a magnitude less than required to change the state of magnetization of the core permanently.

Information will be read from the core by the application of a current pulse to another one of said windings. This current pulse will read simultaneously all of the binary information bits stored in the core. Proper choice of current pulses applied to the last mentioned winding may provide non-destructive readout of the core.

Further and additional objects and advantages will become apparent hereinafter during the detailed description of the embodiment of the invention which is to follow and which is illustrated in the accompanying drawing, wherein:

FIG. 1 is a circuit diagram including a schematic representation of a magnetic element embodying this invention and showing the magnetic element in use in a memory system.

Figures 2A, 2B, 2C, 2D:
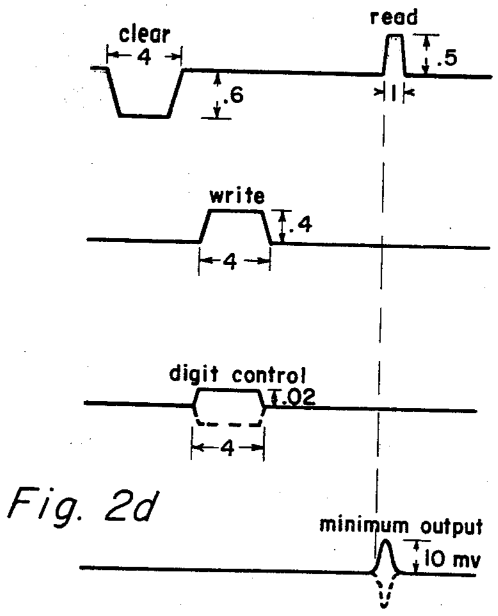

FIGS. 2*a*–2*c* are graphical representations of input signals with the abscissa representing duration in microseconds and the ordinate representing the magnitudes in amperes of electrical currents applied to the windings as shown.

FIG. 2*d* is a graphical representation of the output signal with the abscissa representing the duration in microseconds and the ordinate representing the amplitude of the output pulse in millivolts.

Turning now to FIG. 1, an annulus or ring 10 having a principal aperture 11, is composed of ferrite or other magnetic material exhibiting a substantially rectangular magnetic hysteresis characteristic, and is perforated with a number of small holes or secondary apertures 12, 14, 16, 18, 20, approximately midway between the inner and outer edges of the ring 10, as shown in FIG. 1. The ring 10 is used to store an input binary number or word comprising a plurality of binary bits or digits. The holes 12–18 are each associated with the storage of an individual binary bit of information comprising said binary number or word. The hole 20 is not a binary bit storage hole, but is utilized during the "write" process, as will be described below.

For the purpose of explanation, the ring 10 will be considered to be divided into two flux paths; an outer flux path which is that portion of the ring 10 lying between the holes 12–20 and the outer edge of the ring 10, and an inner flux path comprising that portion of the ring 10 lying between the holes 12–20 and the inner edge of the ring 10. Each of the holes 12–18 has an associated digit control winding 22 shown linking the outer flux path and the ring 10. However, the digit control windings 22 could be made to link either both the inner and outer flux paths in opposite senses or just the inner flux path. The holes 12–18 are also provided with sense windings 24 which are shown linking only the inner flux path but which could equally link either the outer or both flux paths. The hole 20 is provided with a winding 26 which is shown linking the outer flux path. This winding also could link either or both flux paths. The ring 10 is also provided with a winding 28, wound through the aperture 11, which links both flux paths in the same sense.

The "write" process in which information is inserted into the area surrounding the holes 12–18 will now be described. First, a unidirectional current pulse, shown as a negative-going current pulse, of a magnitude sufficient to saturate the ring 10 in one direction, is applied to the winding 28 by the pulse source 29. This pulse, which is called the "clear" pulse, establishes the magnetic state of the ring 10 such that information may be inserted or written into each of the areas surrounding the holes 12–18. A binary bit of information is written into an area such as the area surrounding the hole 12 when pulses are applied simultaneously to the "write" winding 26 and the digit control windings 22. A current pulse of relatively small magnitude is applied to the digit control winding 22 in a direction determined by the binary bit to be recorded. Thus, a pulse of a first direction will be passed through the digit control winding 22 if a binary "0" is to be recorded and a pulse of the opposite direction will be passed through the digit control winding 22 if a binary "1" is to be recorded. For the purpose of this invention, the pulse must contain energy less than that energy required to cause a permanent change of the magnetic state of the area surrounding the hole 12. These current pulses are supplied to each winding 22 by respective current pulse sources 30 which are responsive to the particular binary bit to be recorded. Thus, each current pulse source 30 provides a current pulse of a first direction if the binary bit to be recorded is a binary "0" and provides a current pulse of opposite direction if the binary bit to be recorded is a binary "1."

Simultaneously with the application of the current pulse to the digit control winding 22, a pulse is applied to the winding 26 by a pulse source 32. This pulse must have a magnitude sufficiently large that the outer flux path will become oppositely saturated producing a magnetic discontinuity in the area surrounding the hole 20, thus breaking the continuity of the flux paths through the ring 10. The simultaneous control of the write and digit control windings is represented in the coupling of a write control source 33 to sources 30 and 32.

It has been found that the application of the relatively small current pulses to the winding 22 will cause a change in the state of magnetization of the area surrounding the hole 12. This change has been shown to be dependent upon the direction of current pulse applied to the winding 22 such that upon application of a pulse to the winding 26 simultaneously with the application of the current pulse to the winding 22, two distinguishable magnetic states can be produced selectively to represent a binary "0" and a binary "1." The precise nature of the change is not known at this time. However, it is sufficient for the purpose of this invention that two differing and distinct magnetic states be produced.

FIG. 2*b* shows the electrical signal applied to the "write" winding 26. FIG. 2*c* shows the electrical signal applied to the digit control winding 22. The digit control pulse shown in FIG. 2*c* can have a positive sense, as shown by the solid line, or a negative sense, as shown by the dotted line. The direction or sense of the current pulse shown in FIG. 2*c* will be controlled by the binary bit to be recorded, as stated above.

The "read" process, in which information stored in the ring 10 is extracted as an output, requires that a "read" pulse be applied to the winding 28 by the pulse source 29, as shown in FIG. 2*a*. The "read" pulse is that portion of the electrical signal shown in FIG. 2*a* which is labeled "read." The passage of the "read" pulse through the winding 28 will simultaneously detect the nature of any disturbance of the flux paths in each of the areas surrounding the holes 12–18. Thus, upon the application of the "read" pulse to the winding 28, electrical signals will be produced in the windings 24. These signals will actuate a plurailty of readout devices 36, connected respectively to each of the windings 24 and will distinguish whether a binary "0" or a binary "1" was recorded in the areas surrounding each of the holes 12–18. The readout devices 36 will be actuated according to the electrical signals received.

If it is desired to make the "read" process non-destructive, it is necessary to control the energy contained in the "read" pulse so that it produces no permanent change in the state of magnetization of the ring 10. It should be understood, however, that if the "read" pulse were of such a magnitude as to produce a permanent change of the state of magnetization of the ring 10, the device would still function. However, the nondestructive feature would be lost.

It should be still further understood that if the "digit control" and "write" pulses were of such a magnitude as to produce a permanent change of the magnetization of the ring 10, the device would function as described. However, if, as in most practical applications, it is desired to use a plurality of rings 10 to store a plurality of binary words, a permanent effect produced by current pulses through the winding 22 would make impossible the use of a coincident current memory system, since such a system requires that no single current produce a permanent effect and further requires the coincidence of two or more currents to produce such a permanent effect. This coincidence requirement provides the possibility of a word-organized memory using a coincident current "write" operation. As described above, the present embodiment of this invention requires the coincidence of pulses in the windings 22 and 26 before any permanent effect is produced.

The following are the circuit parameters and details of construction of one practical embodiment of the present invention. However, numerous modifications, some of which have already been suggested, may be made without departing from the spirit of this invention.

Core data:
- Each of the windings shown in FIG. 1 has two turns.
- Material—Ferrite
- Outer diameter—0.280 inch
- Inner diameter—0.160 inch
- Thickness—0.034 inch
- Diameter of holes 12–20—0.036 inch Electrical data:
- "Clear" pulse—0.6 amperes, 4.0 microseconds
- "Read" pulse—0.5 amperes, 1.0 microsecond
- "Write" pulse—0.4 amperes, 4.0 microseconds
- "Digit control" pulse—0.02 amperes, 4.0 microseconds
- "Output" pulse—10 millivolts (minimum), 1.0 microsecond (approximate)

There has been disclosed a novel and improved magnetic memory element capable of operation at relatively high speeds and of simple and inexpensive manufacture which is suitable for use in a coincident current memory system. As has been shown, a single magetic core may be used to store a binary word and also provides a nondestructive readout of stored information.

What is claimed is:

1. A magnetic memory element comprising an annulus of magnetic material having a substantially rectangular hysteresis characteristic, said annulus having a principal aperture and a plurality of secondary apertures therein; a first winding magnetically coupled to said annulus through said principal aperture and responsive to first and second electrical signals for controlling inner and outer magnetic flux paths through said annulus simultaneously; a pulse coupled to said first winding source for providing said first and said second electrical signals; a write signal source producing a write electrical signal; a second winding magnetically coupled to said annulus through a first of said secondary apertures and connected to said write signal source and responsive to said write electrical signal for controlling the magnetic state of the area surrounding said first secondary aperture to produce discontinuities in said inner and outer flux paths; a plurality of control signal sources, each producing a control electrical signal; a plurality of windings magnetically coupled to said annulus, one through each of the remaining secondary apertures, and each winding being further connected to a respective one of said control signal sources, each winding of said plurality of windings being responsive to a respective one of said plurality of control electrical signals for controlling the magnetic state of the area surrounding each of said remaining secondary apertures; a plurality of output windings magnetically coupled to said annulus, one through each of said remaining secondary apertures for producing electrical signals in response to energization of said first winding by said second signal, indicative of said magnetic states; means coupled to said control and write signal sources for simultaneously operating said signal sources; and a plurality of output devices respectively coupled to said output windings and responsive to said last mentioned electrical signals.

2. Apparatus according to claim 1 in which each of said plurality of electrical signals has an energy content less than that energy required to permanently change the state of magnetization of said annulus.

3. A magnetic memory element, comprising: a core member of magnetic material having a substantially rectangular magnetic hysteresis characteristic, said core member having a principal aperture and at least two secondary apertures therein; a first winding magnetically coupled to said core member through said principal aperture; means connected to said first winding to apply clear and read pulses thereto of opposite electrical sense and at differing times, said clear pulse having sufficient electrical energy to cause said first winding to magnetically set said core in a first magnetic state and said read signal having insufficient electrical energy to cause said first winding to permanently change the magnetic state of said magnetic core; a write winding magnetically coupled to said magnetic core through one of said secondary apertures; a control winding magnetically coupled to said magnetic core through the remaining secondary aperture; respective write and control pulse sources connected to said write and control windings means connected to said write and control pulse sources for simultaneously operating said write and control pulse sources and producing simultaneous electrical pulses of an electrical sense to produce a permanent magnetic state adjacent said remaining secondary aperture, differing from that magnetic state produced by said first winding when energized by said clear signal; and a sense winding magnetically coupled to said magnetic core through said remaining secondary aperture and having a voltage induced therein upon application of a read pulse to said first winding.

4. A magnetic memory element, comprising: a core member of magnetic material having a substantially rectangular magnetic hysteresis characteristic, said core member having a principal aperture and a plurality of secondary apertures therein; a first winding magnetically coupled to said core member through said principal aperture; means connected to said first winding to apply clear and read pulses thereto of opposite electrical sense and at differing times, said clear pulse having sufficient electrical energy to cause said first winding to magnetically set said core in a first magnetic state and said read pulse having insufficient electrical energy to cause said first winding to permanently change the magnetic state of said magnetic core; a write winding magnetically coupled to said magnetic core through one of said secondary apertures; respective control windings magnetically coupled to said magnetic core through the remaining secondary apertures; a write pulse source connected to said write winding for applying a write pulse thereto; respective control pulse sources connected to said control windings and producing electrical control pulses of one sense or the reverse; means connected to said write pulse source and said control pulse sources for simultaneously operating said write and control pulse sources; said write pulse in combination with each control pulse producing a permanent magnetic state adjacent each of said remaining secondary apertures of one magnetic sense or the opposite; and respective sense windings magnetically coupled to said magnetic core through each of said remaining secondary apertures and each having a voltage induced therein upon application of a read pulse to said first winding, indicative of the magnetic state of said magnetic core thereat.

References Cited by the Examiner

UNITED STATES PATENTS

| | | | |
|---|---|---|---|
| 2,944,249 | 7/60 | Kuntzleman | 340—174 |
| 2,962,215 | 11/60 | Haynes | 340—174 |

IRVING L. SRAGOW, *Primary Examiner.*

EVERETT R. REYNOLDS, BERNARD KONICK, *Examiners.*

UNITED STATES PATENT OFFICE

CERTIFICATE OF CORRECTION

Patent No. 3,187,311 June 1, 1965

Arthur E. Wennstrom

It is hereby certified that error appears in the above numbered patent requiring correction and that the said Letters Patent should read as corrected below.

Column 4, line 50, after "pulse" insert -- source --; line 51, strike out "source".

Signed and sealed this 24th day of May 1966.

(SEAL)
Attest:

ERNEST W. SWIDER
Attesting Officer

EDWARD J. BRENNER
Commissioner of Patents